UNITED STATES PATENT OFFICE.

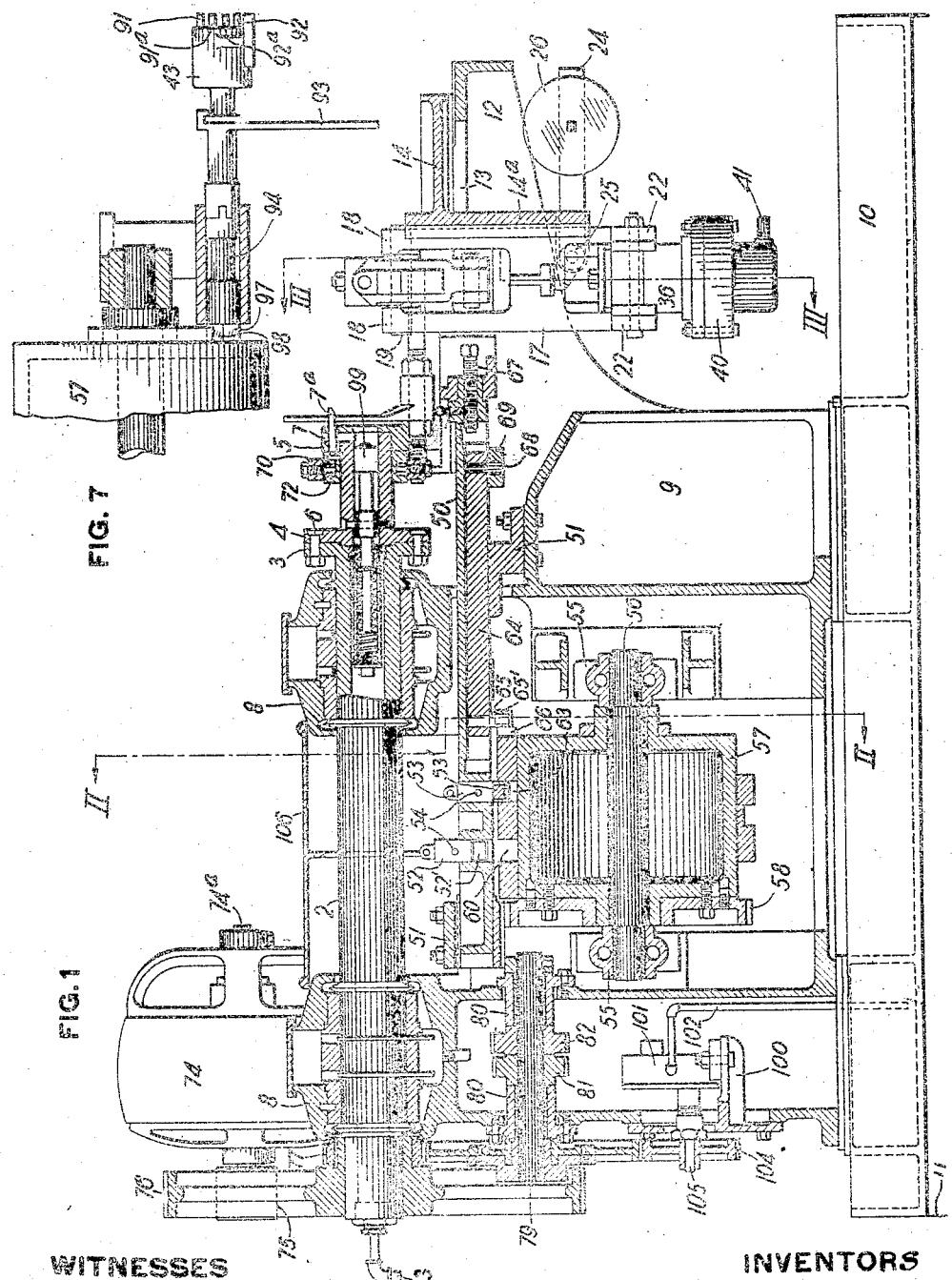

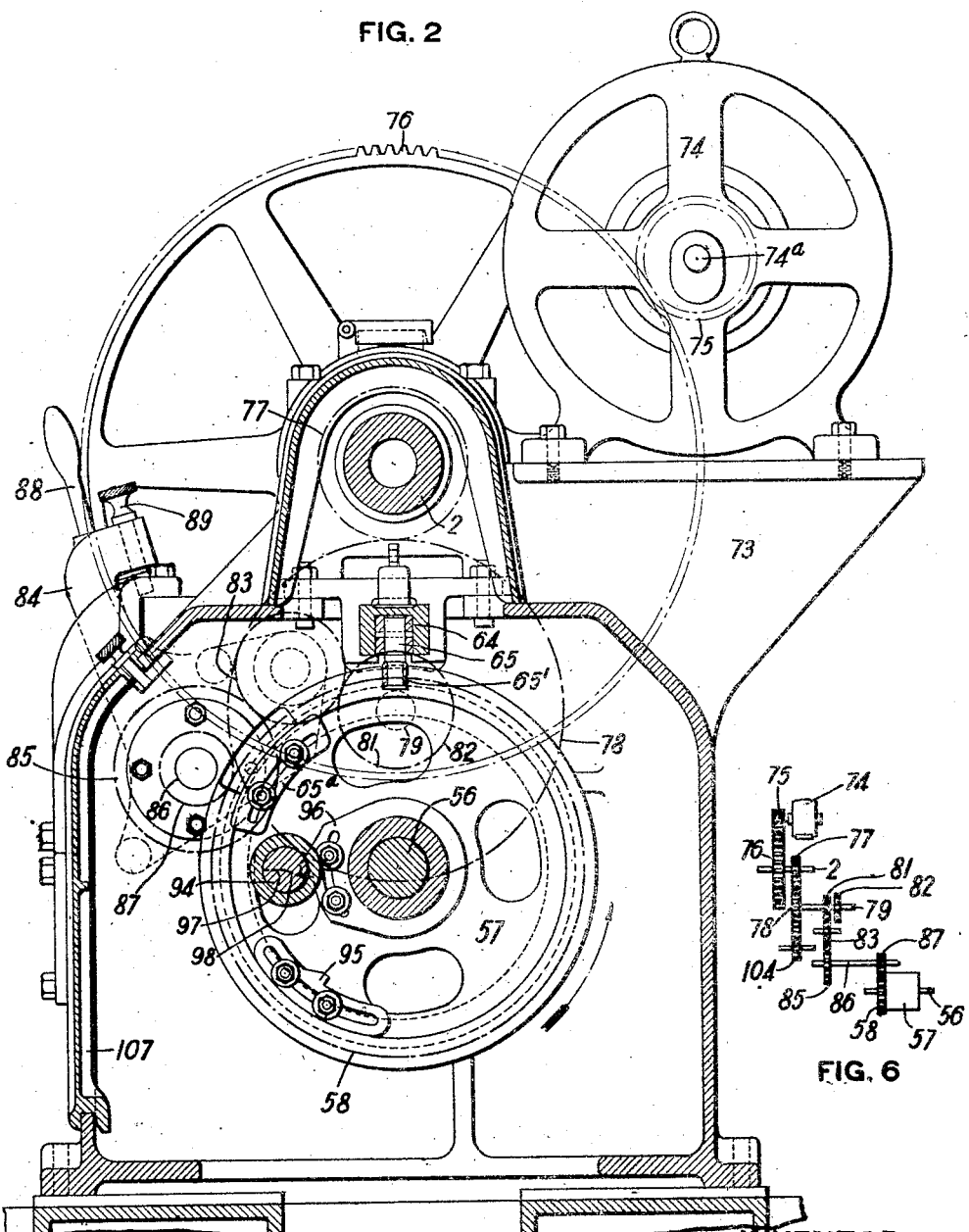

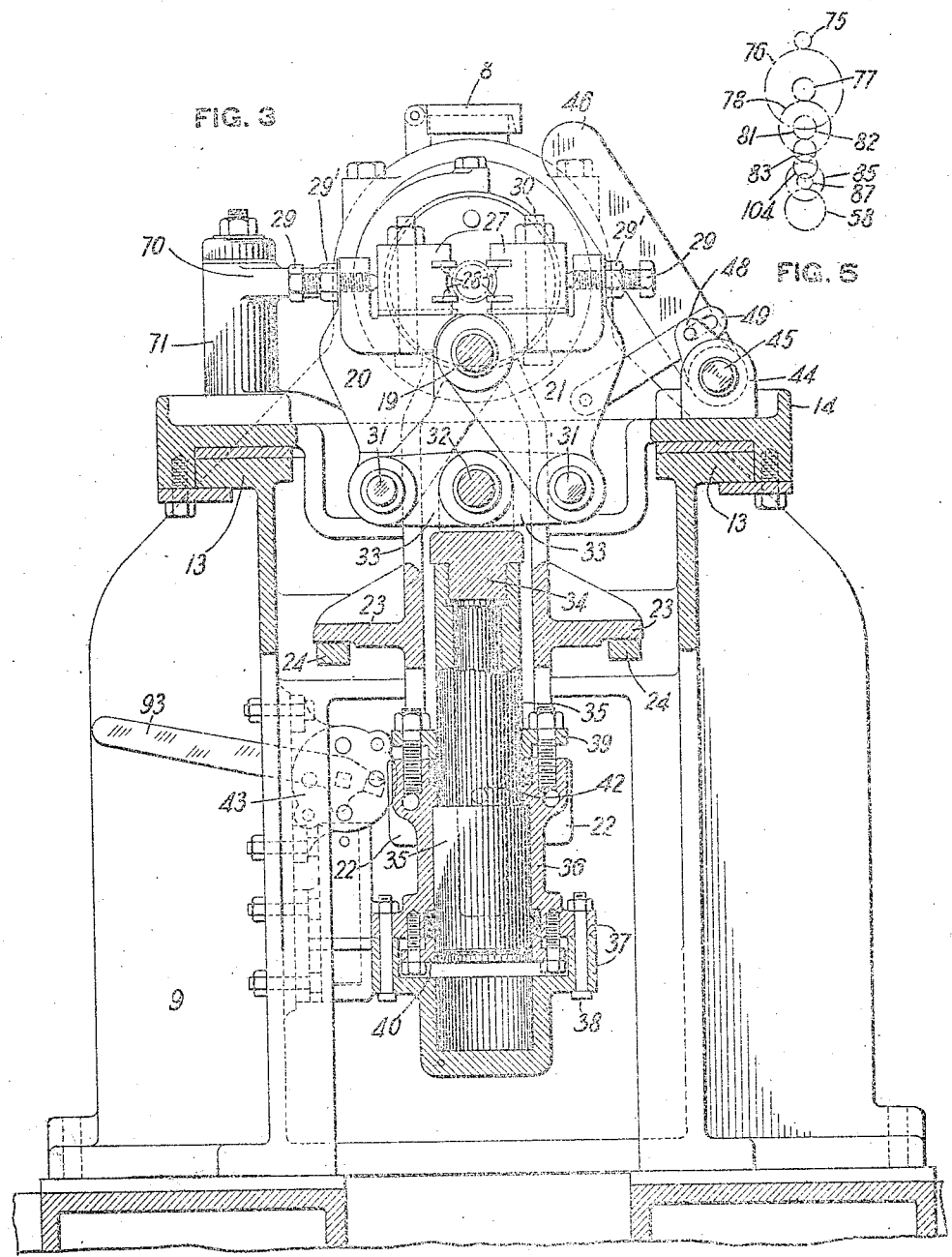

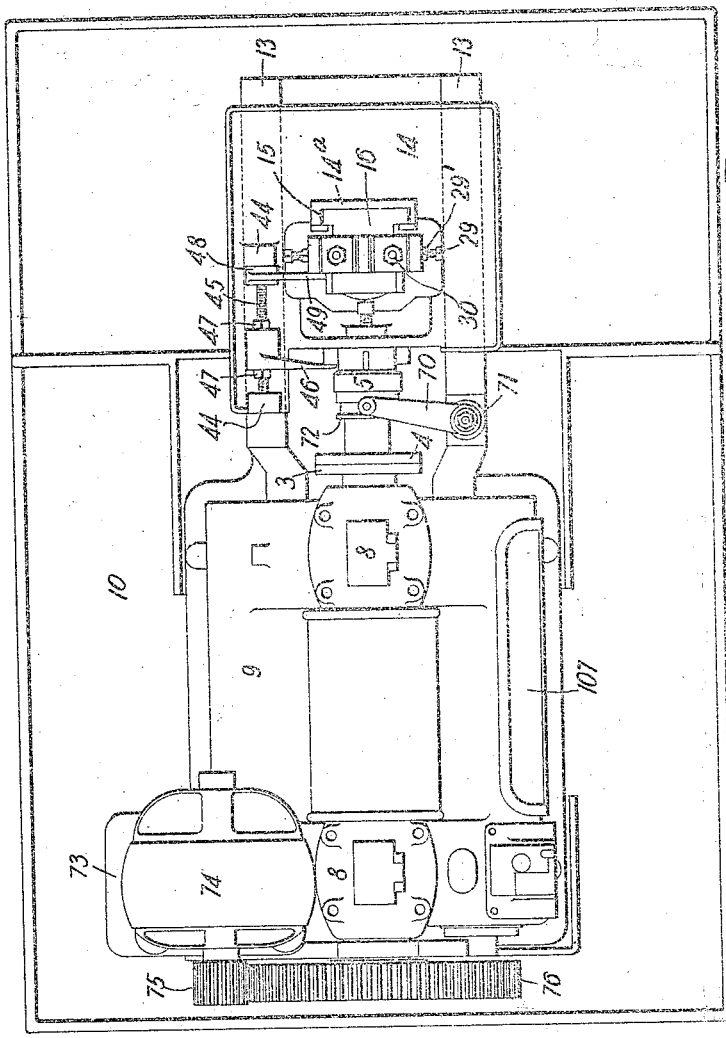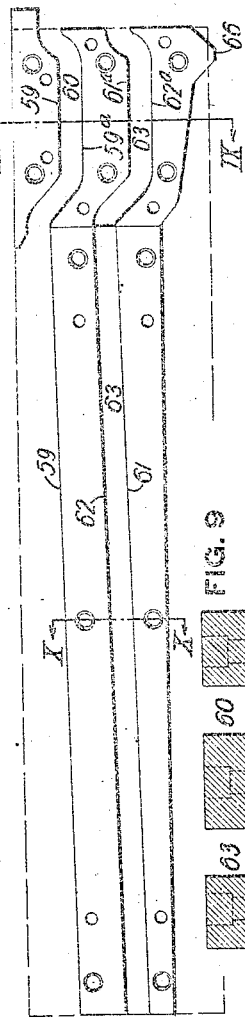

AUGUSTUS M. SAUNDERS AND OLIVER M. MOWAT, OF McKEESPORT, PENNSYLVANIA, ASSIGNORS TO NATIONAL TUBE COMPANY, OF PITTSBURGH, PENNSYLVANIA, A CORPORATION OF NEW JERSEY.

THREAD-CUTTING MACHINE.

1,040,583.  Specification of Letters Patent.  Patented Oct. 8, 1912.

Application filed August 4, 1911. Serial No. 642,388.

*To all whom it may concern:*

Be it known that we, AUGUSTUS M. SAUNDERS and OLIVER M. MOWAT, of McKeesport, in the county of Allegheny and State of Pennsylvania, have invented certain new and useful Improvements in Thread-Cutting Machines, of which the following is a specification.

Our invention relates to apparatus used in cutting screw threads upon cylindrical articles and more particularly relates to apparatus employed in cutting tapered screw threads upon the ends of pipes, tubes and similar annular bodies.

One object of our invention is to provide an automatic threading machine having mechanical means for successively gripping the pipe or other article being threaded, bringing the end of the gripped pipe and the threading die into engagement, and for simultaneously releasing the gripping mechanism and opening the threading die to disengage the bits of the die from the threaded pipe, after the pipe has been placed in position between the jaws of the gripping mechanism and the desired length of thread has been cut upon its end, without assistance from the operator other than placing the pipes in position between the gripping jaws and removing the threaded pipes from between the open gripping jaws after completion of the thread cutting operations.

Another object of this invention is to provide gripping mechanism having novel means whereby the threads are cut concentric on the pipe while rotation of the pipe during the thread cutting operations is prevented.

Another object of the invention is to provide a thread cutting machine having novel means whereby the thread cutting bits are gradually retracted in cutting the threads on a taper and further retracted after completion of the required length of thread.

A further object of the invention is to provide a thread cutting machine having novel means for feeding the pipe lengthwise during the thread cutting operations at a fixed speed corresponding to the pitch of the threads of the threading dies being used.

A still further object of the invention is to provide adjustable means whereby threads of a length which can be varied at will are automatically cut upon successive pipes after the pipes are placed in position in the machine by the operator.

A still further object of this invention is to provide a thread cutting machine having means whereby a complete cycle of operation is carried out mechanically in a given interval including gripping the pipe, cutting the desired length of thread thereon, releasing the threaded pipe and opening or retracting the bits of the threading dies so as to disengage the pipe and the bits and permit the removal of a threaded pipe without unscrewing and the placing of an unthreaded pipe in position in the machine so as to thereby limit the time involved in cutting a given length of thread upon the end of each pipe, and compel the attention of the operator in placing and removing the pipe in the machine at regular intervals and within a given time.

Referring to the drawings forming part of this specification, Figure 1 is a sectional side elevation showing thread cutting apparatus constructed and arranged in accordance with our invention. Fig. 2 is a sectional end elevation of the same on the line II—II of Fig. 1. Fig. 3 is a similar sectional end elevation showing (in closed position) the pipe gripping mechanism forming part of this invention, the section being taken on the irregular line III—III of Fig. 1. Fig. 4 is a plan of the apparatus shown in Figs. 1, 2 and 3. Fig. 5 is a detail diagrammatic elevation showing the arrangement of the gearing forming part of the driving mechanism for the threading machine. Fig. 6 is a diagrammatic plan of the gearing shown in Fig. 5. Fig. 7 is a detail plan showing the cam drum and the operating mechanism for the valve controlling the opening and closing movements of the pipe gripping mechanism. Fig. 8 is a detail on an enlarged scale, showing a development of the members forming the cam surfaces as arranged to form the cam grooves on the periphery of the cam drum forming part of this apparatus. Fig. 9 is a transverse section taken on the line IX—IX of Fig. 8. Fig. 10 is a similar transverse section taken on the line X—X of Fig. 8.

In the accompanying drawings the numeral 2 designates a hollow spindle or shaft having a flange 3 on its outer or front end to which the flange 4 on the inner end of the thread cutting die 5 is removably secured (to permit of various sizes being used) by means of bolts 6.

The outer end of the threading die is provided with a series of radially extending thread cutting bits 7 arranged to move radially inward into cutting position and to be radially retracted or moved radially outward as the thread cutting operation progresses and further retracted at the completion of the necessary length of thread so as to clear the threads cut upon the pipes or other materials operated upon and permit their withdrawal from the threading die 5 without being "backed out" or unscrewed therefrom.

The spindle 2 is rotatably mounted in ring oiling bearings 8, 8, mounted upon the base or frame 9 of the apparatus. The ring oiling bearings being of an old and well known construction are not further described.

The base 9 is provided with marginal bottom flanges arranged to support the thread cutting machine upon a suitable foundation, or as shown, to support the apparatus within an oil pan 10 which rests upon the foundation 11.

On the outer or front end of the base 9 is an extension 12 having its top surfaces constructed to form horizontally extending shears or ways 13, 13, which support the horizontally reciprocating carriage 14 for the gripping mechanism.

The carriage 14 has a vertically depending flange 14ª in which a guide recess 15 is formed for the vertically and horizontally movable floating slide 16. The recess 15 is made slightly wider than the slide 16 to permit a small amount of transverse horizontal movement. The slide has a central rib 17 forming vertically extending forked arms terminating at their upper ends in bosses 18, 18, having openings in which the pivot pin 19 for the knees or bent lever arms 20, 21, is secured and terminating at their lower ends in flanges 22, 22, to which the actuating cylinder for the gripping mechanism is fixed.

Brackets 23, 23, extend from opposite sides of the rib 17 and are adapted to engage with and be supported by the inner ends of the two counter-balance levers 24, 24, which are pivoted at an intermediate point lengthwise to lugs 25, 25, on the lower end of the vertically depending flange forming part of the carriage 14. Counterweights 26, 26, adjustably secured on the opposite or outer ends of the levers 24, 24, are employed to yieldingly maintain the gripping mechanism in position vertically with respect to the threading die 5.

The knees or bent arms 20, 21, pivotally secured to the bosses 18 on the slide 17 by the pivot pin 19, have horizontal faces on which the blocks or holders 27 are adjustably secured. These blocks or holders have openings or slots in one side surface in which the pipe gripping bits 28 are removably secured. The blocks are adjusted toward and away from each other to suit the varying sizes of pipes threaded by the apparatus by means of adjusting bolts 29 and are held in adjusted position by the bolts 30. Lock nuts 29' also serve to maintain the bolts 29 in position.

The lower ends of the knees 20 and 21 are connected together by means of the pins 31 and 32 and the toggle links 33, the inner ends of these links also being connected by the pin 32 to the head 34 on the piston 35 for the cylinder 36 by which the gripping mechanism is actuated.

The cylinder 36, which is secured to the flanges 22, 22, on the lower end of the rib 17 forming part of the slide 16 is divided transversely into two sections, the abutting ends of the sections having flanges 37 secured together by bolts 38. The top section of the cylinder 36 is provided on each end with a stuffing box in which glands 39 and 40 are secured. The lower end of the piston 35, which piston extends through the stuffing boxes and glands 39, and 40, is arranged to enter the lower section of the cylinder 36, this lower section being constructed so as to inclose the stuffing box and gland 40, in this way providing a double acting cylinder for actuating the gripping mechanism. The opposite ends of the cylinder 36 have ports which are connected by flexible connections 41, 42, to the four way operating valve 43 secured to one side of the frame 9 of the pipe threading machine and through which fluid pressure is supplied to the opposite ends of the cylinder 36.

Secured in the lugs or ears 44, 44, provided along one side of the upper face of the carriage 14 is a rocking shaft 45 having a lever 46 splined thereon so as to be adjustable along the length of the shaft 45 between the lugs 44 and form a target or stop which moves into and out of position to be engaged by the pipes when being placed between the gripping jaws and so regulate the length of thread cut upon the ends of the pipes. Nuts 47 on the shaft 45 engaging the opposite sides of the lever 46 serve to move and hold this lever in its adjusted positions.

Keyed or otherwise secured upon the shaft 45 adjacent to one end thereof is a short lever arm 48 and the outer end of this lever is connected by the link 49 with the knee or bent arm 21 so that when the knees 20, 21, are moved by the piston 35 in the cylinder 36 the rocking shaft 45 is actuated to swing the target or stop 46 into and out of its operative position.

Bolted or otherwise fastened to one end of the carriage 14 is a horizontal carriage arm 50 which is movably secured in stationary bearings or ways 51, 51, on the frame 9, and which is arranged to move the carriage 14 during the thread cutting operations at a rate of speed corresponding to the pitch of the threads being cut upon the pipe. The other end of the arm 50 is provided with two or more openings in which pins 52 and 53 are removably secured, these pins having anti-friction rollers 52', 53' on their lower ends.

Transverse openings 54 or holes are provided at an intermediate point in the length of the pins 52 and 53 in which smaller pins are placed to hold the pins 52 and 53 in lifted position on the carriage arm 50 so as to not project downwardly below the bottom surface of the arm 50, into engagement with the cam surfaces provided on the cam drum located on the frame 9 beneath the carriage arm 50 and hollow spindle 2.

Mounted in the bushed bearings 55, 55, which are removably secured on the interior of the frame 9 is a rotatable shaft 56 having a cam drum 57 keyed or otherwise secured thereon and a spur driving gear wheel 58 is also mounted on the shaft 56 for driving this drum, as shown, (Fig. 1), the driving gear 58 being bolted to one end of the drum 57.

The peripheral surface of the cam drum 57 is provided with members removably secured thereon as shown, having opposite cam surfaces 59 and 59$^a$ forming a cam groove 60 on the drum into which groove the anti-friction roller 52' (on the lower end of the pin 52) on the carriage arm 50 is caused to extend and operatively connect the carriage 14 with the cam drum when cutting threads of one pitch. The periphery of the drum is also provided with members having opposing cam surfaces 61, 61$^a$ and 62, 62$^a$ which form a second cam groove 63 on the periphery of the cam drum 57 into which groove the anti-friction roller 53$^a$ on the pin 53 is adapted to extend and operatively connect the cam drum 57 with the carriage 14 during the thread cutting operations in cutting threads of a different pitch on the ends of pipes held on the carriage 14 by the pipe gripping mechanism. (A development showing the relative location of the members forming the cam grooves 60 and 63 and also the cam dog 66 is shown in Fig. 8).

The carriage arm 50 which operatively connects the cam drum 57 with the carriage 14 has a lengthwise extending recess in its bottom surface in which the longitudinally movable finger bar 64 is placed. The finger bar 64 has a pin 65 adjacent to its inner end which projects downwardly below the bottom surface of the bar 64 and has an anti-friction roller 65' on its lower end. The bar 64 is caused to move longitudinally in the recess in the carriage arm 50 in one direction (left to right in Fig. 1) by the cam surface 66 on the cam drum 57 which at each revolution of the cam drum contacts with the anti-friction roller on the lower end of the pin 65. The finger bar 64 is gradually moved in the opposite direction (right to left in Fig. 1) when engaged by the end of the screw 67 which is adjustably secured in the end of the carriage bar 50, this gradual movement actuating the wedges 7$^a$ to move outwardly or retract the cutters or bits 7 in the die head 5 and form a taper thread on the pipe held between the gripping jaws. When the required gradual movement has been effected, the inclined face of the cam dog 65$^a$ on the end of the drum 57 engages with the pin 65 and quickly retracts or moves the cutting bits outwardly for the balance of their radially outward movement so as to clear the threaded pipes. After the cam dog 65$^a$ has engaged the pin 65 to move the bits 7 into their fully retracted position, continued rotation of the drum 57 causes the cam surface 66 of the drum 57 to engage the pin 65 and through the medium of the before described connecting mechanism, move the bits 7 toward each other into position to engage and again cut a thread upon the end of another pipe held in position between the gripping jaws. The outer end of the finger bar 64 is provided with a pin 68 which projects downwardly and is engaged by the forked outer end of the lever arm 69 forming part of the crank arm 70 which is pivoted on the carriage 14 and which forms part of the mechanism for actuating the radially movable threading bits in the threading die 5.

The arm 70 which is swiveled on the vertical post 71 which is fixed to the extension 12 also is forked, and the forked outer end of this arm embraces the collar or sleeve 72 which is slidably mounted so as to be axially movable on the flanged end of the threading die 5 in moving the bits 7 of the threading die into and out of their cutting position.

The length of the thread cut on the pipes varies with different sizes of pipes and the movement of the finger bar 64 is practically the same at all times. The relative movement of the carriage arm 50, which reciprocates the carriage 14, varies with the length of thread desired on the pipes and in order to cause the bits of the thread cutting die 5 to be gradually moved outward in cutting the tapered threads and rapidly retracted when this length of thread has been cut the screw 67 in the end of the carriage arm 50 is adjusted, so as to engage with the end of the finger bar 64 at the right intervals.

On one side of the frame 9 is a shelf or extension 73 upon which the driving motor 74 for the pipe threading machine is mounted. The armature shaft 74ª is provided with a spur pinion 75 which meshes with and drives the spur gear wheel 76, which is keyed or otherwise secured to and rotates the hollow spindle 2. A second smaller spur gear 77 which is mounted on and rotated by the spindle 2 meshes with and rotates the sectional gear wheel 78 secured to the outer overhanging end of the change gear shaft 79 which is mounted in bushed deadeye bearings 80, 80, removably secured to the frame 9. The shaft 79 is provided with two spur pinions 81 and 82, of different sizes, both of which are arranged to, at different times, be in mesh with and drive at differing speeds the idler spur gear wheel 83, which is mounted in dead-eye bearings formed on the swinging gear arm 84. The gear 83 also meshes with and drives the spur gear wheel 85 splined on the shaft 86, which is mounted in the bearings secured to the frame 9 of the thread cutting machine.

The rocking arm 84 has dead-eye bearings by which it is pivoted on the shaft 86 and this arm also is movable longitudinally on the shaft to permit of the sidewise movement necessary to shift the gears 83 and 85 in bringing the idler gear 83 into mesh with one or the other of the spur gears 81, and 82, in changing the speed of rotation of the cam drum. One end of the shaft 86 is provided with a spur pinion 87 which meshes with the spur gear wheel 58 by which the cam shaft 56 and drum 57 are driven.

A handle 88 is secured to the upper end of the gear shifting arm 84 and the lower end of a pin 89 also secured on this arm is adapted to enter suitable openings or holes provided in the frame 9 of the apparatus to maintain the arm and gears thereon in each of the two positions in which the arm 84 of the apparatus as shown may be placed.

Secured to the interior of the frame 9 is a four way valve 43 (see Fig. 7) having outlets connected by flexible conduits 91, 92, to the ports on the opposite ends of the cylinder 36 secured on the carriage 14 and employed to actuate the gripping mechanism. This valve also has an inlet opening 91ª connected to a source of air or other fluid pressure supply and an exhaust outlet opening 92ª which is connected by the valve with one or the other of the ports 41—42 on the cylinder 36.

The valve 43 has a handle 93 by which it may be manipulated manually and this valve is also connected to the rock shaft 94 through which the valve is mechanically actuated to open and close in mechanically actuating the gripping mechanism at the right intervals by the cam drum. Finger cams 95 and 96 are adjustably secured on one end of the cam drum 57 so as to engage with one or the other of the cam rocking surfaces 97 and 98 on the valve rock shaft 94 and operate the valve so as to actuate the clamping mechanism to first grasp and after completion of the thread cutting operations, release the successive pipes placed in position between the gripping jaws of the clamping mechanism which is mounted on the movable carriage 14.

A reamer 99 mounted in the longitudinally extending opening in the threading die 5 is arranged to be engaged by the advancing end of the pipe being threaded so as to remove any bur present on the ends of the pipes during the thread cutting operations. The construction and use of the reamer on thread cutting machines being old and well known is not further described.

Mounted upon a removable bracket 100 secured on one end of the frame 9 of the apparatus is an oil pump 101 having an inlet opening provided with a pipe 102 extending below the level of the pool of oil collected in the oil pan 11, and an outlet pipe 103 which connects the pump with one end of the hollow spindle 2 through which oil is supplied to the threading die 5 on the opposite or outer end of this spindle.

A spur gear 104 meshes on one end of the pump shaft 105 on the pump 101 meshes with and is driven by the spur gear wheel 78 on the shaft 79.

A removable shield 106 is provided to cover the exposed parts of the spindle 2 between the bearings 8, 8, and a door or cover 107 is removably secured on the frame 9 to close the doorway or opening through the side of the hollow frame 9.

The operation of the apparatus is as follows:—The finger cams 95 and 96 located on the end of the cam drum 57 are adjusted to the required positions, and, depending upon the pitch of the thread to be cut, one or the other of the pins 52 and 53 is lowered until it is in its cam groove 60 or 63. The set screw 67 is also adjusted so as to move the finger bar 64 in retracting the bits 7 of the threading die 5 at the proper time and the valve rock shaft 94 is moved to cause the cylinder 36 to open the gripping jaws and at the same time lower the target or stop 46. The thread cutting bits in the threading die 5 are also moved toward each other into their thread cutting position, this movement being governed by the movement of the finger bar 64 by the cam face 66 on the cam drum 57. The operator then places a pipe A between the bits 28 on the gripping jaws with the end of the pipe in engagement with the target or stop 46. At this time the stop 46 is not in the position shown in Fig. 3 but is in its depressed position—in front of the opening in the threading die. The motor 74 having been started, the drum 57 is caused to rotate and the finger cam 95 on the end of the drum, by engagement with the cam rocking surface 97 on the valve rocking shaft 94, actuates the valve so as to cause the gripping mechanism to grasp the pipe. The closing movement of the gripping jaws only moves or lifts the target or stop 46 out of the way of the longitudinally moving pipe and into the position shown in Fig. 3. As the motor continues to rotate the drum 57, one of the pins 52 or 53 then in engagement with the cam surfaces on the drum feeds the carriage 14 and the pipe secured thereon forwardly at a speed corresponding to the pitch of the thread being cut by the bits in the die head 5, and also, through the finger bar 64, gradually moves the cutting bits 7 in the threading die 5 so as to cut a taper thread on the end of the pipe, and, when one revolution of the cam drum has been made, the cam surface 66 on the carriage end of the cam drum 57 will have engaged with the pin 65 and will have moved the finger bar 64 into position to be again engaged and moved in the opposite direction by the cam dog 65ª into the position shown in Fig. 1 and will have moved the cutting bits radially outward sufficiently to clear the threads then cut upon the end of the pipe. In each revolution of the cam drum, the cam surface 66 on one end of this drum engages with the pin 65 on one end of the finger bar 64 and moves it from left to right (Fig. 1), so as to, through the connecting mechanism, move the sleeve 72 and advance the bits 7 of the threading die 5 toward each other into closed or thread cutting position. At the same time the finger cam 95 engages with the cam rocking surface 98 on one end of the valve rock shaft 94 and actuates the valve so as to admit fluid pressure to the opposite end of the cylinder which causes the gripping jaws to release their hold on the pipe. The operator then removes the so-threaded pipe and immediately replaces it with another pipe to be threaded. As the apparatus is being constantly operated, the time in which the pipe can be removed and replaced between the gripping jaws is limited by the rate of speed at which the apparatus is operated. When another pipe has been placed between the gripping jaws by the operator, the cam finger 96 on the cam drum through the cam face on the valve operating shaft, moves the valve to admit fluid pressure to the lower end of the cylinder 36 which again causes the pipe gripping jaws to close and grasp another pipe between the gripping jaws.

The above described operations are then continued with successive pipes and in this way the pipes are rapidly and accurately threaded.

We claim:—

1. A thread cutting machine comprising a rotary thread cutting die, means for driving said die and gripping mechanism having jaws for holding the articles during the thread cutting operations, said gripping mechanism being arranged to have a limited vertical and horizontal movement during the thread cutting operations.

2. A thread cutting machine comprising a rotary thread cutting die, means for driving said die, gripping mechanism having jaws for holding the articles during the thread cutting operations, said gripping mechanism being arranged to have a limited vertical and horizontal movement during the thread cutting operations, and a counterweight for counter-balancing the vertically movable portions of the gripping mechanism.

3. A thread cutting machine comprising a rotary thread cutting die, means for driving said die, gripping mechanism having jaws for holding the articles during the thread cutting operations and a lever for determining the length of thread cut upon the articles arranged to move into and out of the path of movement of the articles being threaded, said die driving means while in operation being arranged to mechanically actuate the die, gripping mechanism and lever in pre-arranged sequence.

4. A thread cutting machine comprising a rotary thread cutting die, means for driving said die, gripping mechanism having jaws for holding the articles during the thread cutting operations, a lever forming a stop arranged to move into and out of the path of movement of the articles being threaded to determine the length of thread cut upon the articles threaded, and means operatively connecting the gripping mechanism with said lever by which said lever is moved into and out of operative position, said die driving means while in operation being arranged to mechanically actuate the die, gripping mechanism and lever in pre-arranged sequence.

5. A thread cutting machine comprising a rotary thread cutting die, means for driving said die, gripping mechanism having jaws for holding the articles during the thread cutting operations and a lever arranged to move into and out of the path of movement of the articles being threaded to determine the length of thread cut upon the articles threaded, said lever being adjustable to vary the length of said threads, said die driving means while in operation being arranged to mechanically actuate the die, gripping mechanism and lever in pre-arranged sequence.

6. A thread cutting machine comprising a frame, a rotary die head having bits radially movable into and out of the thread cutting position, means for positively rotating said die head, a support movable toward and away from the die head having gripping jaws mounted thereon, means carried on said support for actuating the gripping jaws and a cam operatively connected to said head rotating means, said cam being arranged to actuate the gripping jaws and simultaneously therewith move the bits into cutting position in the rotary die and to retract the bits and release the gripping jaws after the completion of the thread cutting operations.

7. A thread cutting machine comprising a rotary cutting head, means for driving said head, and gripping mechanism having jaws for holding the articles during the thread cutting operations, a lever arranged to move into and out of the path of movement of the articles being threaded to determine the length of thread cut upon the articles, and means operatively connecting the gripping mechanism and said lever with the head rotating means by which said gripping mechanism and said lever are mechanically moved into and out of holding position in predetermined order.

8. A thread cutting machine comprising a frame, a rotary head having bits radially movable into and out of thread cutting position, means for positively rotating said head, a support movable toward and away from the rotary head having gripping jaws mounted thereon, means carried on said support for actuating the gripping jaws and a cam operatively connected to said head rotating means, said cam being arranged to actuate the gripping jaws and move the bits into cutting position in the rotary head, bring articles held between the gripping jaws into thread cutting engagement with the bits in the head, and then retract the bits and release the gripping jaws after completion of the thread cutting operations in the order named.

In testimony whereof, we have hereunto set our hands.

AUGUSTUS M. SAUNDERS.
OLIVER M. MOWAT.

Witnesses:
C. H. STARR,
JAS. P. DAVIS.